US 8,038,189 B2

(12) United States Patent
Tsukamoto

(10) Patent No.: US 8,038,189 B2
(45) Date of Patent: Oct. 18, 2011

(54) TOOL FOR PICKING AND CARRYING DOG DUNG

(76) Inventor: Tatusabu Tsukamoto, Saga (JP)

( * ) Notice: Subject to any disclaimer, the term of this patent is extended or adjusted under 35 U.S.C. 154(b) by 621 days.

(21) Appl. No.: 11/911,619

(22) PCT Filed: Apr. 4, 2006

(86) PCT No.: PCT/JP2006/307527
§ 371 (c)(1),
(2), (4) Date: Dec. 4, 2008

(87) PCT Pub. No.: WO2006/112282
PCT Pub. Date: Oct. 26, 2006

(65) Prior Publication Data
US 2009/0085363 A1    Apr. 2, 2009

(30) Foreign Application Priority Data

Apr. 15, 2005  (JP) ................ 2005-119100
Jan. 20, 2006  (JP) ................ 2006-013247
Feb. 22, 2006  (JP) ................ 2006-045718

(51) Int. Cl.
*A01K 29/00*     (2006.01)
*E01H 1/12*      (2006.01)

(52) U.S. Cl. ........................................ 294/1.5

(58) Field of Classification Search .......... 294/1.4, 294/1.5, 19.1, 55; 119/161; 15/257.1, 257.6
See application file for complete search history.

(56) References Cited

U.S. PATENT DOCUMENTS

| | | | | |
|---|---|---|---|---|
| 4,042,269 A | * | 8/1977 | Skermetta | 294/1.5 |
| 4,368,907 A | * | 1/1983 | Ross | 294/1.4 |
| 6,164,710 A | * | 12/2000 | Shibuya | 294/1.5 |
| 7,735,886 B2 | * | 6/2010 | Tsukamoto | 294/1.5 |
| 2004/0169384 A1 | * | 9/2004 | Boutwell | 294/1.4 |

FOREIGN PATENT DOCUMENTS

| | | |
|---|---|---|
| JP | 3015127 U | 8/1995 |
| JP | 1056908 A | 3/1998 |
| JP | 2005176632 A | 7/2005 |
| JP | 2006136301 A | 6/2006 |

OTHER PUBLICATIONS

International Search Report of PCT/JP2006/307527, date of mailing Aug. 1, 2006.

* cited by examiner

*Primary Examiner* — Dean Kramer
(74) *Attorney, Agent, or Firm* — Westerman, Hattori, Daniels & Adrian, LLP

(57) ABSTRACT

In a tool for picking up and carrying dog dung that includes a container longitudinally swingably supported at the tip of a shaft part and a cover placed on the container to swing in a direction opposing the container. When an opening part of the container is covered with the cover, the container is upward positioned roughly perpendicularly to the shaft part When the dung is discharged, the container and the cover are opened to incline on one side of the shaft part, so that a tool washable by brushing because of the small number of support and operation members existing around the container. A shaft includes one shaft supporting unit at one end of the shaft part, the shaft supporting unit having a swing axis parallel to a cover swing axis. The container is longitudinally swingably supported so that its container supported part formed on one side of the rear outer wall near the opening part and having the same axis as the cover swing axis is supported on the shaft supporting unit. The operating member includes an operation unit retained on the shaft part. The container swings about the swing axis of the shaft supporting unit while the cover swings about the cover swing axis in a direction opposing the container.

21 Claims, 9 Drawing Sheets

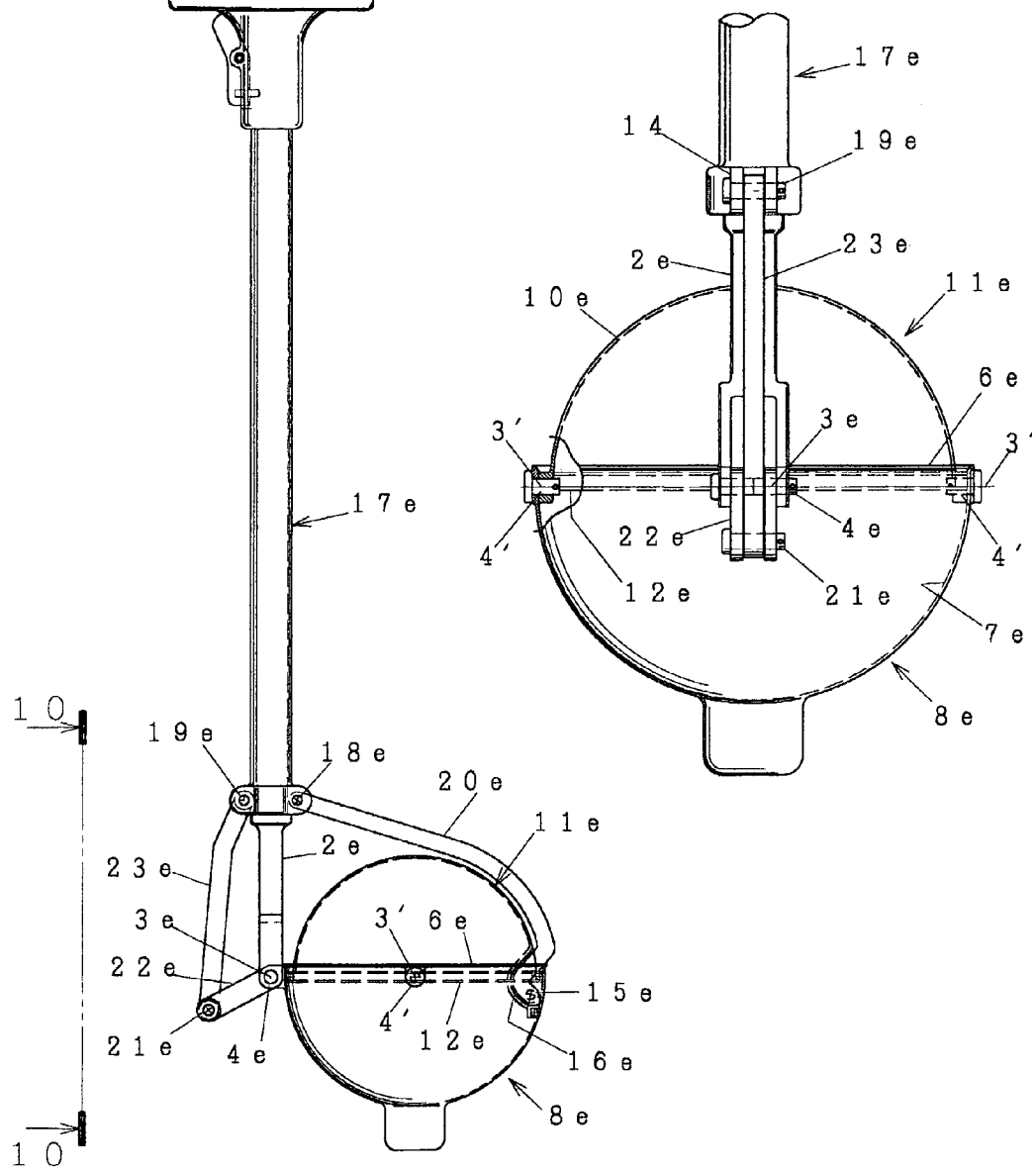

FIG. 11
FIG. 12
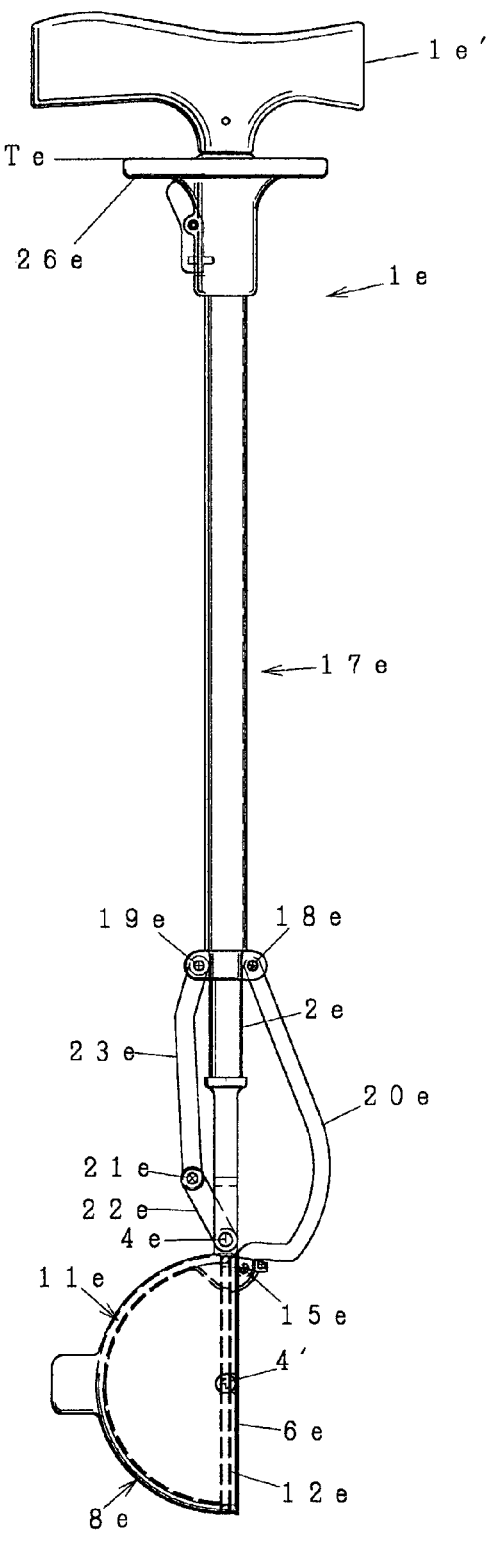
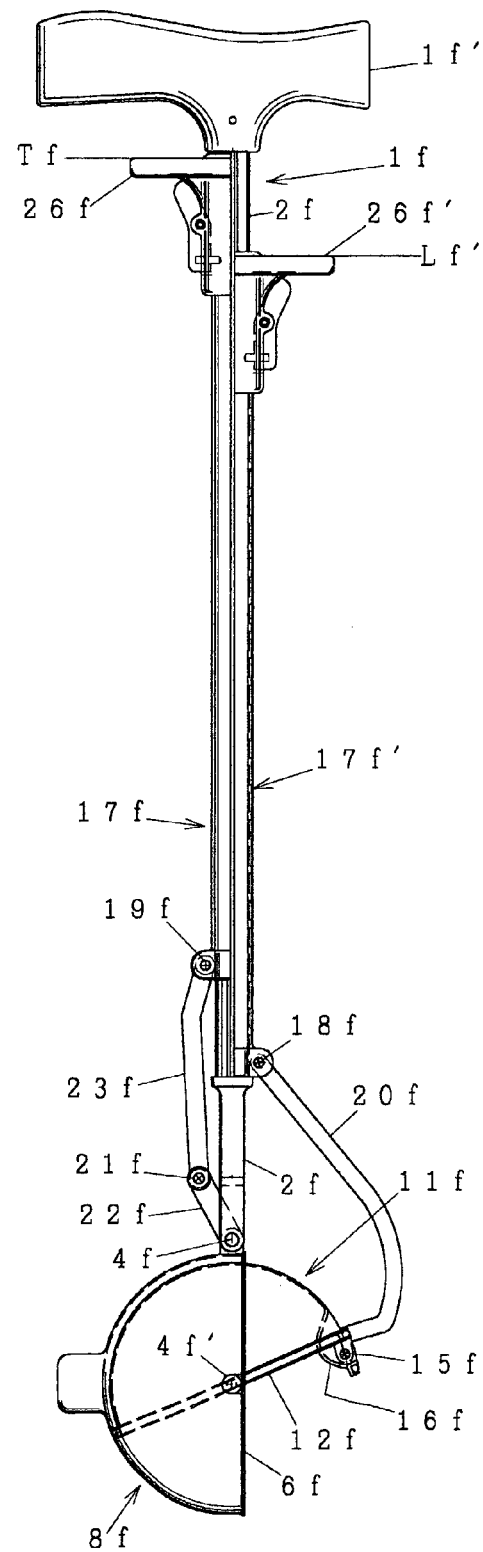

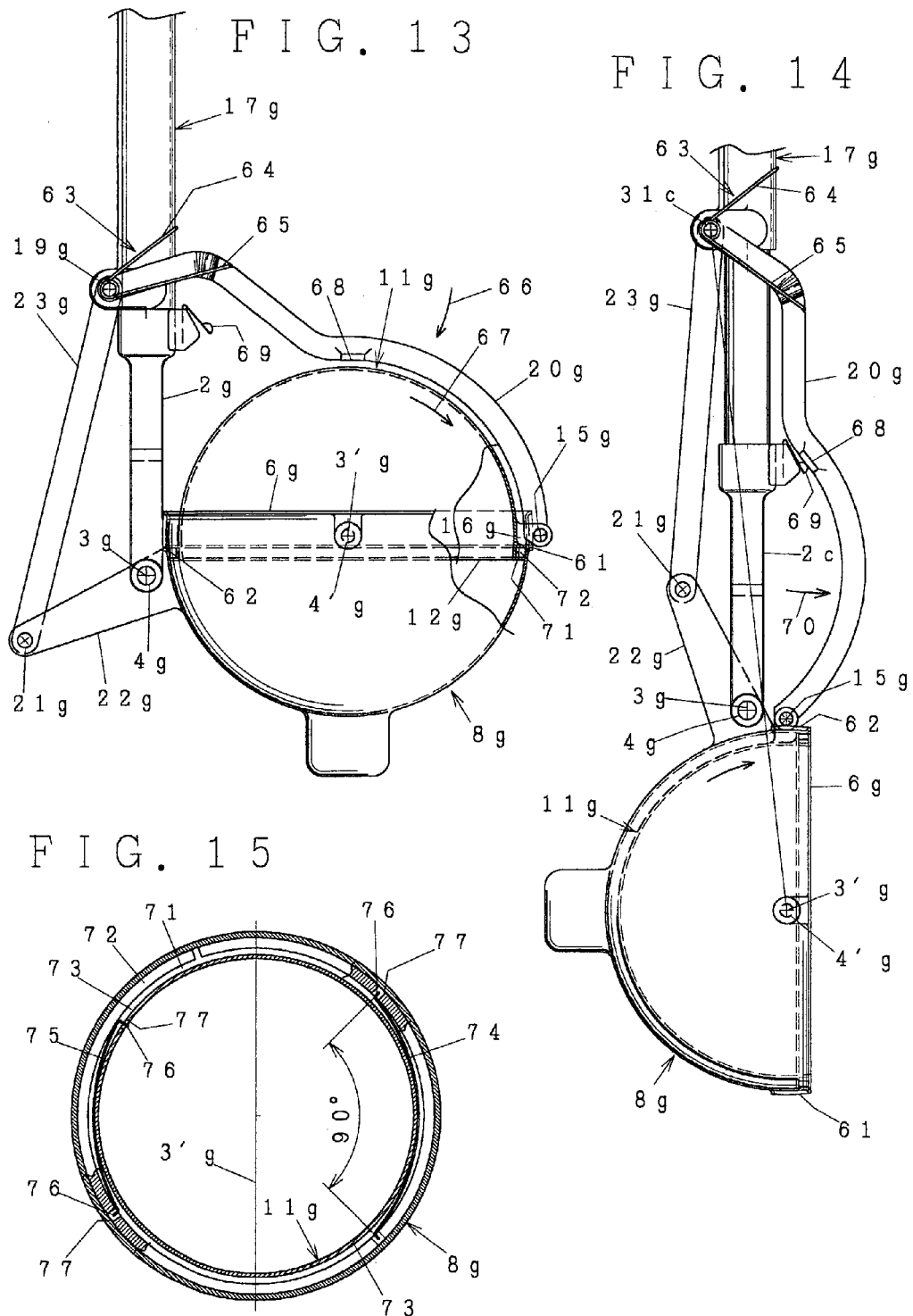

TOOL FOR PICKING AND CARRYING DOG DUNG

TECHNICAL FIELD

The present invention relates to a tool for picking up and carrying dog dung so as to discharge it at a predetermined place by carrying the tool during walking around for dogs.

BACKGROUND ART

The tool disclosed in PCT/JP2004/018687 published on Jun. 30, 2005 includes a container swingably supported at the tip of a grip part, in which when a cover is put on the container, the container is upward positioned roughly perpendicularly to the grip part, and the container is largely opened roughly in parallel with the grip part when dog dung is discharged, so that at an intermediate opening position, the container is inclined in a direction suitable for catching the dung. The tool can be roughly divided into two kinds. One includes the container and the cover swinging in directions opposing each other about support points arranged at both lateral ends of the opening of the container so as to open/close the opening of the container. The other includes the container and the cover swinging in a sector form in directions opposing each other about each support point arranged at one end of the opening of the container so as to open/close the opening.

It is especially important for a tool for picking up and carrying dog dung to be easily cleaned for always maintaining the tool clean, so that it is preferable that no support member and no operation member exist around the container and the cover so that the container and the cover are completely exposed. The existence of the support member around the container and the cover may obstruct the cleaning and the picking up the dung, and furthermore, it may entangle weeds to be remained therein.

One of embodiments of the above-mentioned PCT/JP2004/018687 requires an operation link intersecting in the longitudinal direction with a lateral arm part for supporting a swing fulcrum of the container and the cover, so that it is difficult to clean the circumference of the container by brushing. In another embodiment, the dung in the container can be scraped out only with the cover, so that the tool has a disadvantage that the dung adheres to the container to be remained.

It is an object of the present invention to provide a tool for picking up and carrying dog dung in that the outside of a container can be easily cleaned by brushing when washing it with water because of the small number of supporting and operation members existing around the container.

It is another object of the present invention to provide a tool for picking up and carrying dog dung in that the container and a cover can be more largely opened in a more appropriate direction when picking up and discharging the dung, and when picking up the dung, the container is accessible to under the afterpart of a dog from the lateral back side of the dog without being obstructed by a support member and so forth.

It is another object of the present invention to provide a tool for picking up and carrying dog dung in that the container and the cover are compact because their support point is separated so that the tool is simple in structure and is easily manufactured, and furthermore the dung in the container can be scraped out with the cover.

It is another object of the present invention to provide a tool for picking up and carrying dog dung in that the container and the cover can be swung in a direction opposing each other in operatively associated with one operation unit so as to close the container and to pickup and discharge the dung while the handling is easy such that by independently operating the container and the cover, the container can be closed and the dung can be picked up and discharged.

It is another object of the present invention to provide a tool for picking up and carrying dog dung in that when the dung is discharged, the dung can be efficiently scraped out while the container can be closed and opened with light operations.

DISCLOSURE OF INVENTION

A tool for picking up and carrying dog dung according to the present invention includes a container longitudinally swingably supported at the tip of a shaft part, the container having a concave inner wall part and a flat opening part; and a cover supported on the container swingably on one of inner and outer sides of the container near the peripheral portion of the container in a direction opposing the container about a cover swing axis laterally passing through the center near the opening part of the container, the cover having fringing means for approaching and covering the opening part of the container and a cover part arranged inside, wherein when the opening part of the container is covered with the cover by operating means provided in the shaft part, the container is upward positioned roughly perpendicularly to the shaft part; during discharging dung, the container and the cover are inclined to one side of the shaft part so as to open; and at an intermediate position of opening/closing, the container is opened in a direction for picking up the dung, and wherein a shaft includes one shaft supporting means at one end of the shaft part, the shaft supporting means having a swing axis parallel to the cover swing axis; the container is longitudinally swingably supported so that its container supported part formed on one side of the rear outer wall near the opening part and having the same axis as the cover swing axis is supported on the shaft supporting means; the operating means includes an operation unit retained on the shaft part slidably along the axial direction and an operation member including container connecting means connected at its lower portion to part of the container longitudinally rotatably and cover connecting means connected to part of the cover longitudinally rotatably; and the container swings about the swing axis of the shaft supporting means while the cover swings about the cover swing axis in a direction opposing the container.

Preferably, in the tool for picking up and carrying dog dung, the container supported part includes a container shaft part arranged on one side of the container on the cover swing axis near the opening part of the container to extend outside in parallel with the opening part; the cover includes a cover shaft part arranged on the same side as that of the container shaft part on the cover swing axis in parallel with the fringing means; the cover is supported on shaft supporting means so that the cover shaft part is together supported on one of outer and inner sides of the container coaxially with the container shaft part and swingably about the cover swing axis; the operation member of the operating means includes container connecting means longitudinally rotatably connected to part of the container shaft part on the side of the shaft part and cover connecting means longitudinally rotatably connected to part of the cover shaft part; and the container and the cover are swung about the cover swing axis in directions opposing each other.

Preferably, connecting means of the operation member includes the container connecting means including a container link with one end connected to one part of the operation member on one side of the front and rear of the swing axis and the other end connected to a container lever formed in the container shaft part; and the cover connecting means including a cover link with one end connected to the other part of the operation member on the other side of the swing axis and the other end connected to a cover lever formed in the cover shaft part.

Preferably, also the connecting means of the operation member includes the container connecting means including a container rack formed in one part of the operation member on one side of the front and rear of the swing axis in parallel with the shaft part and a container gear formed in the container shaft part to mate with the container rack the cover connecting means including a cover rack formed in the other part of the operation member on the other side of the swing axis in parallel with the shaft part and a cover gear formed in the cover shaft part to mate with the cover rack.

Furthermore, in the tool for picking up and carrying dog dung, preferably, the container supports the container supported part arranged on one side part of the rear outer wall in the vicinity of the opening part of the container on the shaft supporting means longitudinally swingably; the operation member of the operating means includes a rear link with the upper end connected to the under part of the operation member and the lower end longitudinally rotatably connected to part of the rear side of the container and a front link with the upper end connected to the under part of the operation member and the lower end longitudinally rotatably connected to part of the cover in front of the cover swing axis; and the container swings about the swing axis of the shaft supporting means while the cover swings about the cover swing axis in a direction opposing the container.

Thus, when the container is covered with the cover by operating the operation member the container is upward positioned roughly perpendicularly to the shaft so that the fringing means of the cover blocks off its opening part; during discharging dung, the container and the cover are inclined to one side of the shaft so as to open; and at an intermediate position, the container and the cover can be opened in a direction for picking up the dung.

The tool for picking up and carrying dog dung can be obtained, in which the periphery of the container is largely opened and the small number of obstructing members exists around the container as well as the container can be opened largely enough for picking up the dung.

The operation member herein includes the connecting means provided below the operation unit, such as a link/rack. It also includes a rod or a wire directly connecting the operation unit to parts of the container and the cover.

The operation unit comprehensively includes operation lever means, such as the operation lever and the lever hole described below, and the connecting means for connecting the operation lever means to the operation member, such as an operation lever with gears and an operation rack, further including a grip part arranged at the top of the operation member directly being gripped, a handle, and a lever type finger hook.

It is one of excellent features of the present invention that the container and the cover can be operated in operatively associated with one operation unit of the shaft; alternatively, the container and the cover can also be independently operated.

Preferably, the fringing means of the cover blocking off the inner side of the opening part of the container includes a ring groove formed around the periphery of the cover, a split ring to be fitted into the ring groove, and elastic spreader members held between the inner wall of the split ring and the bottoms of the ring groove on the cover front and rear sides, respectively. Thus, during discharging the dung, when the cover is transferred from the closed position to the opened position, the cover moves with the rear side of the split ring strongly pushing the inner wall of the container so as to scrape out the dung in the container as well as substances stuck to the wall. Then, the cover is opened in the front by overlapping with the inner side of the container.

Other embodiments of the present invention will be apparent in the best mode will be described below.

BRIEF DESCRIPTION OF THE DRAWINGS

FIG. 9 is a side view of a tool for picking up and carrying dog dung according to another embodiment showing a state of a closed cover;

FIG. 10 is a drawing viewed in arrow 10-10 direction of FIG. 9;

FIG. 11 is a side view of the embodiment of FIG. 9 showing a state of the fully opened cover;

FIG. 12 is a side view of a tool for picking up and carrying dog dung according to another embodiment showing a state in that only a container is fully opened;

FIG. 13 is a side view of the vicinity of a container of a tool for picking up and carrying dog dung according to another embodiment, showing a state of a closed cover;

FIG. 14 is a side view of the vicinity of the container according to the embodiment of FIG. 13 showing a state of the fully opened cover; and FIG. 15 is a horizontal sectional view of the ring groove of the cover in FIG. 13.

BEST MODE FOR CARRYING OUT THE INVENTION

Embodiments of the present invention will be described below with reference to the drawings.

Figure 1:
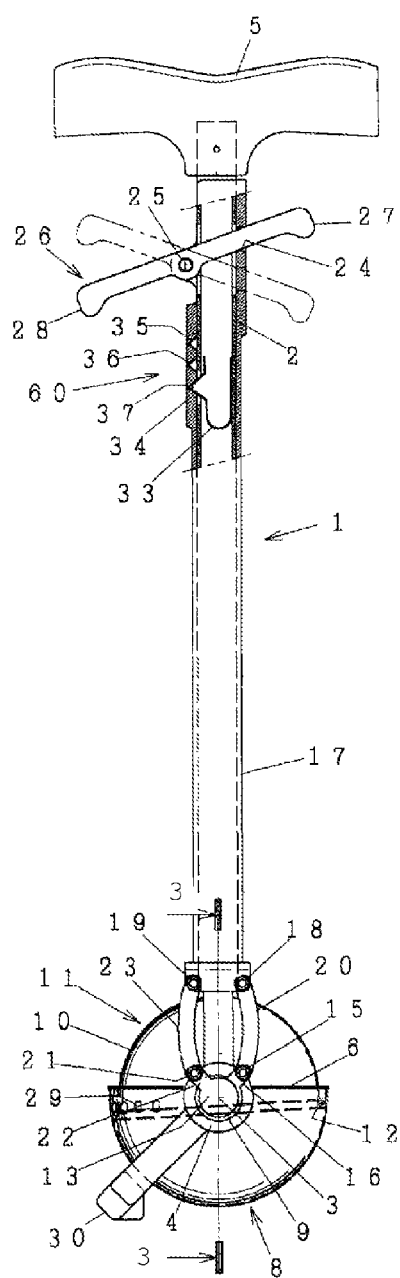
FIG. 1 is a side view of a tool for picking up and carrying dog dung according to an embodiment showing a state of a closed cover.
Figure 2:
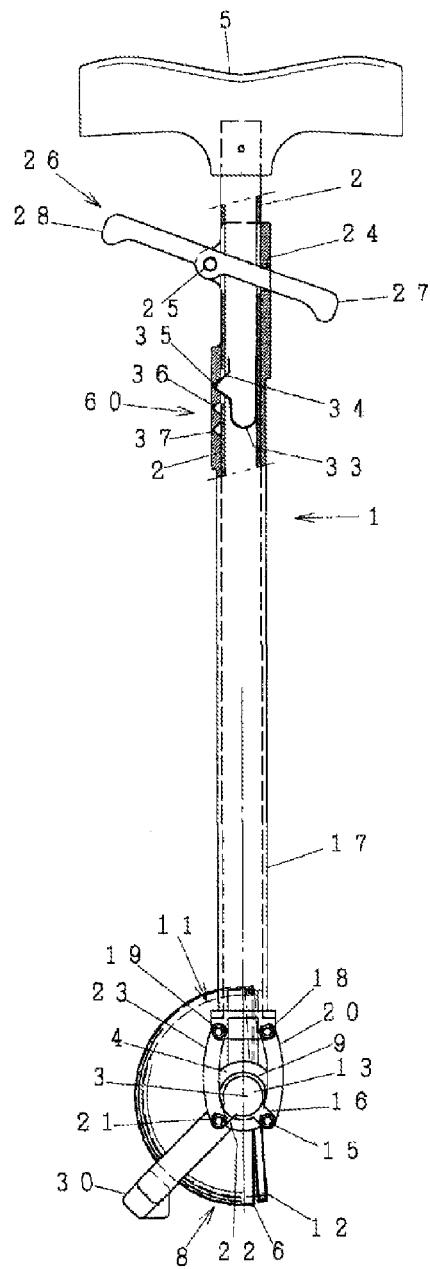
FIG. 2 is a side view of the embodiment shown in FIG. 1 showing a state of the fully opened cover.
Figure 3:
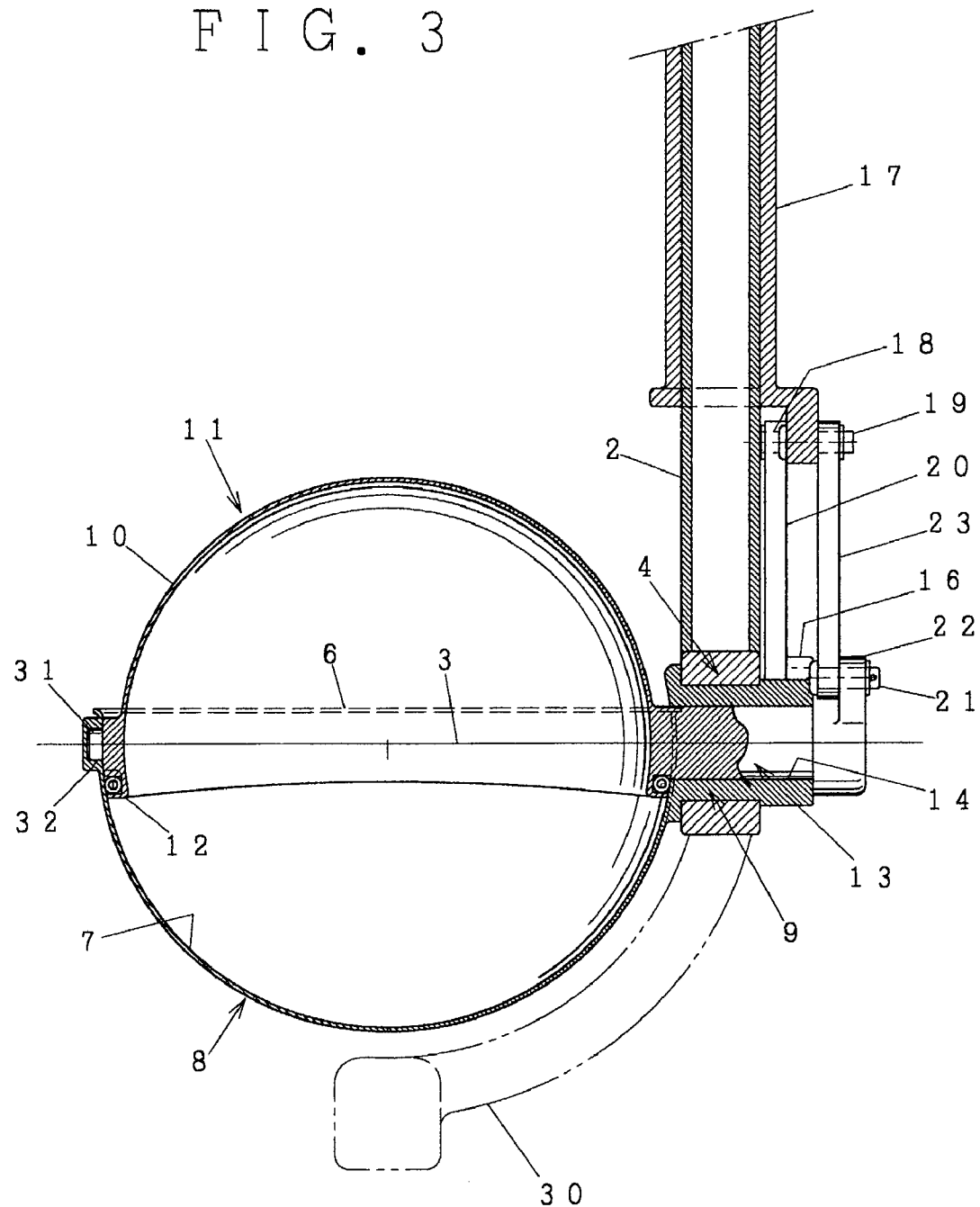
FIG. 3 is a partially cutaway drawing viewed in arrow 3-3 direction of FIG. 1.

FIGS. 1 to 3 show an embodiment in that a container has the same swing axis as that of a cover. The shaft 1 has a crosswise T-shaped grip part 5 at the top end thereof, from the grip part 5 extends a shaft part 2 longitudinally, at the tip of the shaft 2 a shaft support unit 4 being provided, and the shaft support unit 4 is composed of a cylindrical hollow having a central axis intersecting with the shaft part 2 in the lateral direction of the grip part 5. This central axis serves as the swing axis of the container and the cover, and it will be referred to as a shaft swing axis 3. A container 8 includes an opening part 6 to be evenly opened and a concave inner wall part 7, and it also has a container shaft part 9 at one end of the opening part 6. The container shaft part 9, having an axis passing through the center of the container 8 in parallel with the opening part 6, is a shaft part with a diameter rotatably fitting into the shaft support unit 4. The container 8 is supported at one side of the shaft by the container shaft part 9 swingably about the shaft swing axis 3.

Inside the container 8, a cover 11 is attached. The cover 11 includes flat fringing means 12 for covering the opening part 6 by cohering with the opening part 6, a cover part 10 arranged inside the fringing means 12, and a cover shaft part 13 arranged at one side of the fringe portion of the cover 11. The cover shaft part 13, having an axis passing through the center of the cover 11, is rotatably fitted into a cover boss 14 coaxially penetrated inside the container shaft part 9. Thereby, the cover 11 is swingable within the container 8, so that the container 8 and the cover 11 both swing with respect to the shaft swing axis 3. The fringing means 12 is herein made of a tubular rubber seal ring to be fitted into a ring groove provided on the fringe portion of the cover 11, the fringing means 12 is parallel to the shaft swing axis 3.

On the inner wall portion of the opposite side to the shaft parts of the container 8 and the cover 11, axis supporting means may be provided for supporting the axes of both members. Referring to FIG. 3, a cylindrical recess 31 is provided at a position of the opening part 6 of the container 8 opposite to the container shaft part 9 and passing through the shaft swing axis 3 of the inner wall part 7. On the other hand, a protrusion 32 is provided at a corresponding outer wall position of the fringe portion of the cover 11 for rotatably fitting into the recess 31. With the protrusion 32, the end of the fringe portion of the cover 11 is supported by the recess 31 at the end of the container, so that the cover 11 can be swung within the container 8 more stably.

The respective container 8 and the cover 11 have herein a roughly hemispherical shape obtained by reducing a sphere roughly to half, the sphere being obtained by rotating a circle about its center line on the shaft swing axis 3.

Hence, the opening part 6 and the fringing means 12 are circular in contour. A container and a cover shaped in hemispherical or in similar thereto like this embodiment are easily cleaned. It is preferable that a whole shape be similar to a sphere in regard to miniaturization and design in comparison with a containing capacity.

Operating means for operating the container 8 and the cover 11 is provided on opposite side of the shaft part 2. A container lever 16 is provided at a position of the container shaft part 9 opposite to the container with the shaft part 2 therebetween, and the container lever 16 is radially extending in front of the shaft swing axis 3 so as to have a link pin 15 at its end. On the other hand, an operating rod 17 is provided that fits on the shaft part 2 slidably in the axial direction. At the lower end of the operating rod 17, two link pins 18 and 19 are crosswise juxtaposed. The anterior link pin 18 is connected to the link pin 15 of the container lever 16 via a container link 20.

Similarly, at a position of the cover shaft part 13 opposite to the cover, a cover lever 22 is provided, and the cover lever 22 is radially extending in the rear of the shaft swing axis 3 symmetrically with the container lever 16 so as to have a link pin 21 at its end. The posterior link pin 19 is connected to the link pin 21 of the cover lever 22 via a cover link 23.

The length of the container lever 16 herein is not necessarily the same as that of the cover lever 22. Different lengths may also result in different desired swing angles of the container and the cover. It is also not necessary that the container lever 16 and the cover lever 22 are symmetrical fore and aft in inclination with respect to the axial line of the shaft part 2 passing through the shaft swing axis 3. The asymmetrical inclinations may optionally produce the movement difference between the container and the cover.

The operating rod 17 is herein operated via operating lever 26.

The upper front portion of the operating rod 17 extends long upward, and the upward extended portion is provided with a lever hole 24. To a pin receiving portion in the rear of the shaft part 2 and near at one's finger from the grip part 5, a lateral support pin 25 is fixed. An operation lever 26 supported by the support pin 25 is provided to penetrate the shaft part 2 longitudinally and for longitudinally extending. The operation lever 26 is composed of a front lever portion 27 protruding in front of the shaft part 2 and a rear lever portion 28 protruding in the rear, and the operation lever 26 is swingable up and down like a seesaw about the support pin 25 as a fulcrum. The front lever portion 27 of the operation lever 26 penetrates the lever hole 24.

Then, when the front lever portion 27 is fully raised upward as shown in FIG. 1, the operating rod 17 is fully raised so that the container link 20 and the cover link 23 rotate the container lever 16 and the cover lever 22, respectively, so as to close the container and the cover. At this time, the container 8 is upward positioned so that the opening part 6 is roughly perpendicular to the shaft part 2, and the cover 11 is downward positioned on the container 8 and the fringing means 12 blocks off the opening part 6. The dung within the container 8 cannot leak out and its odor cannot also leak out due to the seal ring. Usually, the tool is carried in such a vertical state.

Drain holes 29 formed around the container 8 are for letting out rain water and sands from the periphery of the fringing means 12 when the container 8 is covered so as to prevent water from infiltrating the container. The operating rod 17 propagates its movement via the container link 20 and cover link 23 to the container lever 16 and the cover lever 22 via connecting means between the container lever 16 and the cover lever 22 so as to move them. Other than this rod, a rod like member, a rope, or a wire may be adopted as long as it has the same function.

The operating the operation member via the operation lever 26 provided in the shaft part 2 to move like a seesaw enables the container and the cover to be opened or closed by alternately raising the front and rear levers with parts of front and rear fingers gripping the grip part. In such a manner, the lever moving back and forth like a seesaw is convenient.

Within a space in the lower portion of the support pin 25 of the shaft part 2, a U-shaped leaf spring 33 with one end fixed to the front inner wall of the shaft part 2 is inserted. At the other end of the leaf spring 33, a triangular projection 34 is formed to protrude toward the rear wall of the operating rod 17. The projection 34 is urged rearward by a repulsive force of the spring. On the other hand, on the corresponding inner wall of the operating rod 17, three set grooves 35, 36, and 37 are arranged in the longitudinal direction so as to have a shape fitting the projection 34. Then, as shown in FIG. 1, when the container is covered with the cover 11, the projection 34 fits into the set groove 37. As shown in FIG. 2, when the container and the cover are opened, the set groove 35 is fitted to the projection 34.

Then, when the container and the cover are opened in a direction for picking up the dung, the set groove 36 is fitted to the projection 34. The projection 34 is fitted by movement-resistance maintaining device 60 that comes off by applying a certain moving force to the operation lever 26. Thereby, the container and the cover can be stably maintained at a predetermined position.

In FIG. 2, the rear lever portion 28 is fully raised. At this time, the operating rod 17 is fully pushed down so that the container link 20 and the cover link 23 open the container and the cover via the container lever 16 and the cover lever 22. The container 8 exists in the rear of the shaft part 2; its opening part 6 is raised roughly in parallel with the shaft part 2 to face the front; the cover 11 overlaps with the container in its inside; and the fringing means 12 is raised roughly in parallel with the shaft part 2 to open toward the front. The dung is generally discharged in a vertical state of the shaft as shown in FIG. 2. When the operation proceeds from a state of the opening part 6 of the container closed with the fringing means 12 shown in FIG. 1 to the sate shown in FIG. 2, the fringing means 12 of the cover 11 moves so as to scrape the inner wall part 7 of the container 8, and it pushes out the dung in the container 8 as well as substances stuck on the inner wall part 7 in the front. It is one of advantages that the inner wall part 7 of the container 8 is a revolution surface about the shaft swing axis 3.

The shapes of the container and the cover are not necessarily hemispherical like those shown herein. If the above-mentioned advantage is down-rated, the container is not necessarily a half-turn shaped concave part and the cover is not necessarily a half-turn shaped cover portion.

A support leg 30 is provided at the tip of the shaft support unit 4. The support leg 30 may serve as a support for the tip during picking up the dung. When the tool is stood against a wall, the support leg 30 also serves as a support leg for not touching the tool on the ground. The angle of the support leg 30 to the shaft part 2 inclined to the rear can be reduced less.

After the picking up the dung, the front lever portion 27 is fully raised so as to close the opening part 6 of the container 8 with the fringing means 12 of the cover 11 for carrying the tool with the shaft in the upright state as shown in FIG. 1.

Figure 4:
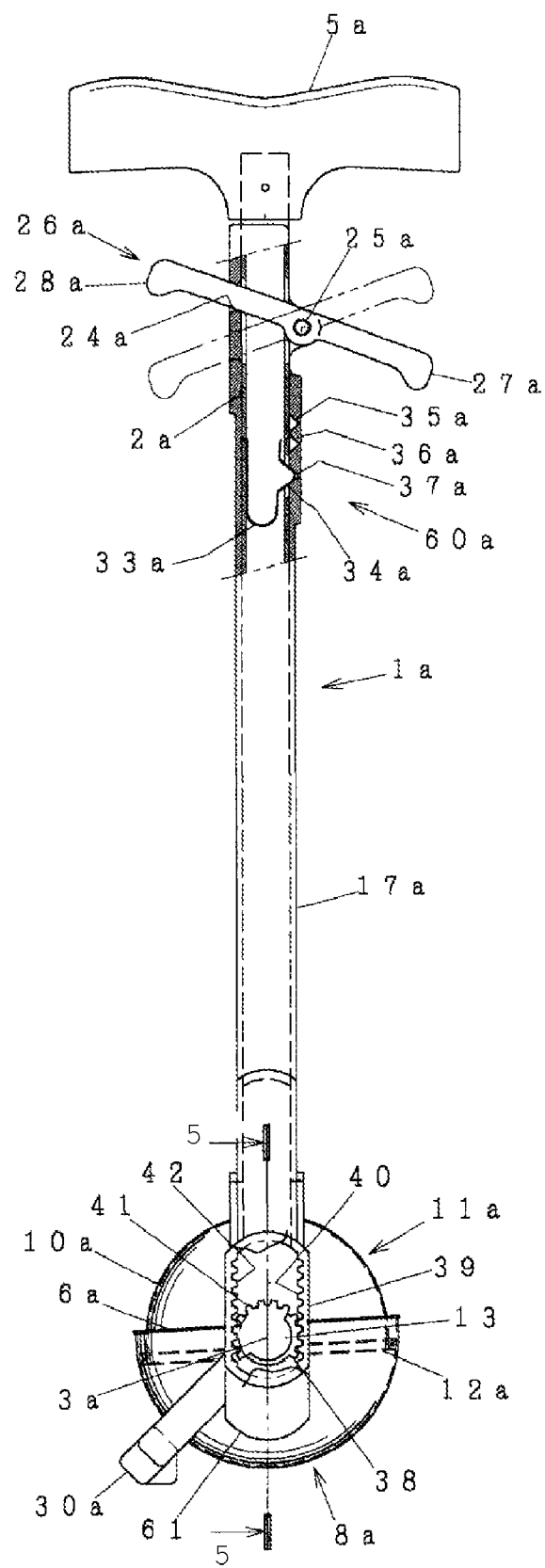
FIG. 4 is a side view of a tool for picking up and carrying dog dung according to another embodiment showing a state of a closed cover.
Figure 5:
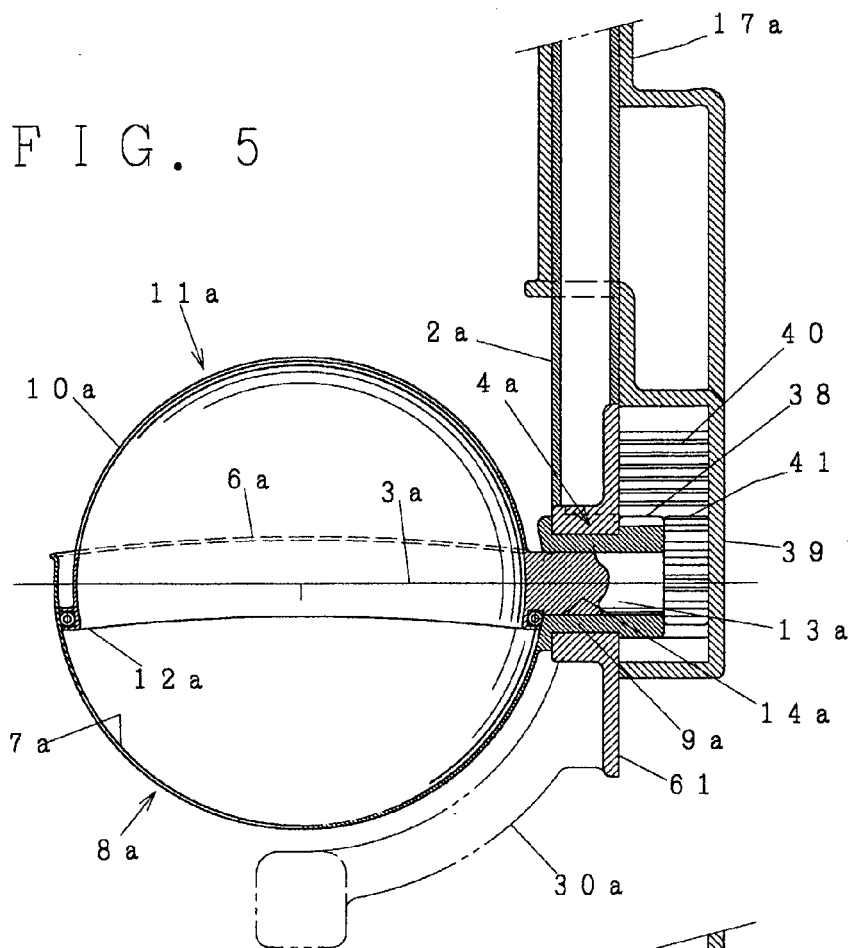
FIG. 5 is a sectional view at the line 5-5 of FIG. 4.

FIGS. 4 and 5 show another embodiment of the present invention. In the description of the embodiments below, like characters having suffixes, such as a, b, c, . . . , added thereto designate like components common to the embodiment described above, and their detailed description is omitted and different points will be mainly described.

According to this embodiment, the connecting means between the operating rod 17*a*, the container shaft part 9*a*, and the cover shaft part 13*a* is different so that the connecting means employs a rack and a gear.

A container gear 38 is provided at a position of the container shaft part 9*a* opposite to the container with the shaft part 2*a* therebetween, and the container gear 38 has teeth located in front of the shaft swing axis 3*a*. Inside a longitudinally long case part 39 in the lower portion of the operating rod 17*a*, a container rack 40 is provided in front of the shaft swing axis 3*a* in parallel to the axis line of the shaft part 2*a* for mating with the container gear 38.

Similarly, at a position of the cover shaft part 13*a* opposite to the cover, a cover gear 41 having teeth in the rear of the shaft swing axis 3*a* is provided, and inside the case part 39, a cover rack 42 is provided in the rear of the shaft swing axis 3*a* in parallel to the axis line of the shaft part 2*a* for mating with the cover gear 41.

In the shaft support unit 4*a* adjacent to the case part 39, a case cover 61 extending up and down is provided so as to serve as closing the inner side of the case part 39 moving up and down.

The upper rear portion of the operating rod 17 extends long upward, and the upward extended portion of the operation unit is provided with a lever hole 24*a*. To the pin receiving portion in front of the shaft part 2*a* and near at one's finger from the grip part 5*a*, the lateral support pin 25*a* is fixed. The operation lever 26*a* supported by the support pin 25*a* is provided to longitudinally penetrate the shaft part 2 and for longitudinally extending. The operation lever 26*a*, in the same way as in the above-embodiment, is composed of the front lever portion 27*a* protruding in front of the shaft part and the rear lever portion 28*a* protruding in the rear, and the operation lever 26*a* is swingable up and down like a seesaw about the support pin 25*a* as a fulcrum. The rear lever portion 28*a* of operation lever 26*a* penetrates the lever hole 24*a*. The direction of operation between the back and the forth is just opposite to the above-embodiment.

Then, when the rear lever portion 28*a* is fully raised upward as shown in FIGS. 4 and 5, the operating rod 17*a* is fully raised so that the container rack 40 and the cover rack 42 rotate the container gear 38 and the cover gear 41, respectively, so as to close the container and the cover. When the front lever portion 27*a* is raised, the operating rod 17*a* is fully pushed down so as to open the container and the cover.

The inner wall part 7*a* of the container 8*a* has a concave spherical surface, and the ring-groove peripheral portion of the fringing means 12*a* of the cover 11*a* has a convex spherical surface closely approaching the inner wall part 7*a*, serving as shaft part supporting means.

Figure 6:
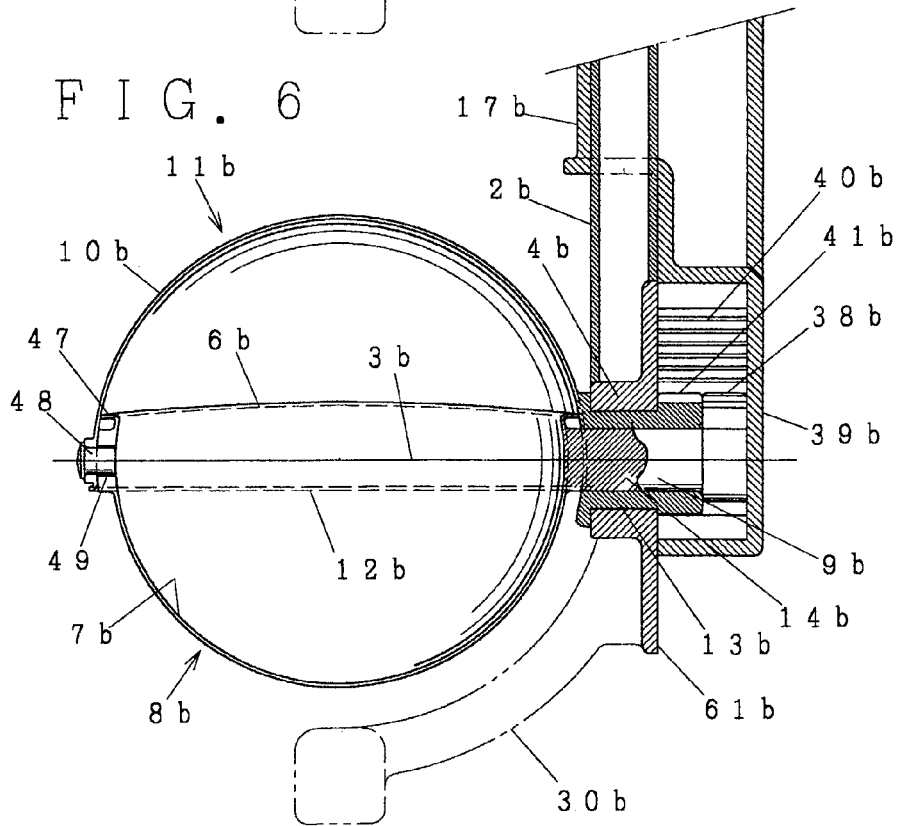
FIG. 6 is a sectional view of the vicinity of a container according to another embodiment.

FIG. 6 shows still another embodiment of the present invention. The cover 11*b* is herein supported to the shaft support unit 4*b* outside the container 8*b*. In the same way as in the first and second embodiments, the container 8*b* and the cover 11*b* are swung about the shaft swing axis 3*b* in directions opposite to each other by the movement of the operating rod 17*b* so as to open/close. The respective container 8*b* and the cover 11*b* have a hemispherical shape obtained by reducing a sphere to half, the sphere being obtained by rotating a circle about its center line on the shaft swing axis 3*b*. Hence, the whole shape of the container having the cover covered thereon is similar to a sphere. The drawing shows the state that the operating rod 17*b* is fully raised and the fringing means 12*b* of the cover deeply covers the outside of the opening part 6*b* of the container. The opening part 6*b* includes an outer flange 47 bent outside so as to approach the inner wall of the cover part 10*b* of the cover. Thus, when the container and the cover move to be opened, the outer flange 47 in the rear of the opening part 6*b* moves along the inner wall of the cover part 10*b* so as to scrape substances stuck to the inner wall for serving as cleaning the container. The outer flange 47 is provided in the container 8*b*, and it has a function like the fringing means of the cover in the first and second embodiments.

On the opposite side to the shaft parts of the container and the cover, axial center supporting means of the container and the cover are provided. On the position opposite to the cover shaft part 13*b* of the periphery of the cover 11*b* and passing through the shaft swing axis 3*b*, a support pin 48 is tightly inserted. On the other hand, on the wall part at a corresponding position of the container 8*b* on the opening part side, a pin hole 49 is provided so as to rotatably fit to the support pin 48. Thus, by the support pin 48, the end of the opening part 6*b* of the container is supported to the support pin 48 of the cover 11*b* on the shaft swing axis 3*b*, so that the container can be swung within the cover more stably.

The container can be directed in optional lateral and longitudinal directions with respect to the grip part, so that such a support unit can be provided.

Figure 7:
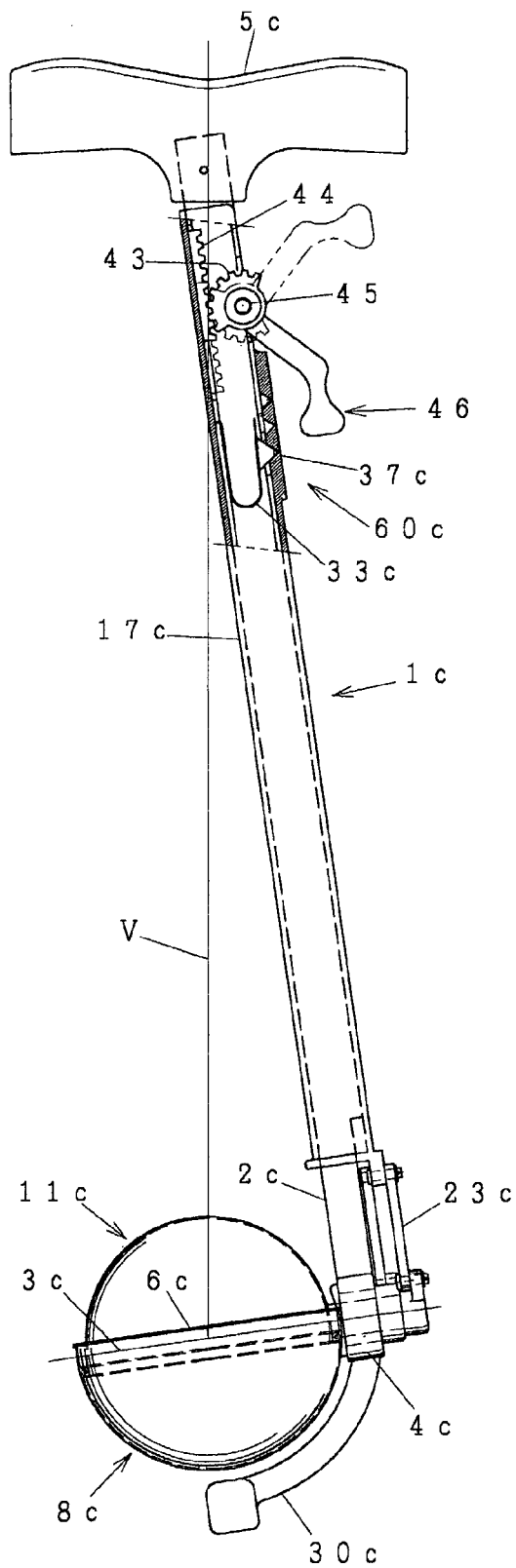
FIG. 7 is a side view of a tool for picking up and carrying dog dung according to another embodiment.

FIG. 7 shows another embodiment of the present invention, in which in the shaft 1*c*, the shaft support unit 4*c* is provided in the longitudinal direction in parallel with the grip part 5*c*. The T-shaped grip part 5*c* is attached to the upper end of the shaft part 2*c* in a tilted position so as to be perpendicular to a vertical line v extending from the center of the container 8*c*. Thus, when carrying the tool, the container 8*c* is positioned directly below the grip part 5*c*.

According to this embodiment, the arrangement around the container and the cover and the connecting means between the operation rod and the shaft parts of the container and the cover are the same as those of the first embodiment; however, different operation lever is provided in the operation unit of the operating rod.

The operating rod 17c is herein operated via an operating lever 46. To the operating rod 17c inside the upward long extending front wall, an operating rack 44 is fixed in the vertical direction. The wall portion in the front (left) of the shaft part 2c within the movement range of the operating rack 44 is perforated so that the operating rack 44 is exposed through the hole inside the shaft part 2c and can be moved up and down. To a lateral pin receiving portion in the rear of the shaft part 2c, a support pin 45 is fixed, and an operating lever 46 is rotationally supported by the support pin 45. The operating lever 46 is provided with a sector gear 43 mating with the operating rack 44 and arranged in the front of a portion to be fitted to the support pin 45. Thus, by operating the operating lever 46 up and down, the operating rod 17c is moved up and down via the operating rack 44 so as to open/close the container and the cover in the same way as in the above embodiments.

It is one of excellent features of the present invention that the container and the cover can be operated in operatively associated with one operation unit; alternatively, the container and the cover can also be independently operated.

Figure 8:
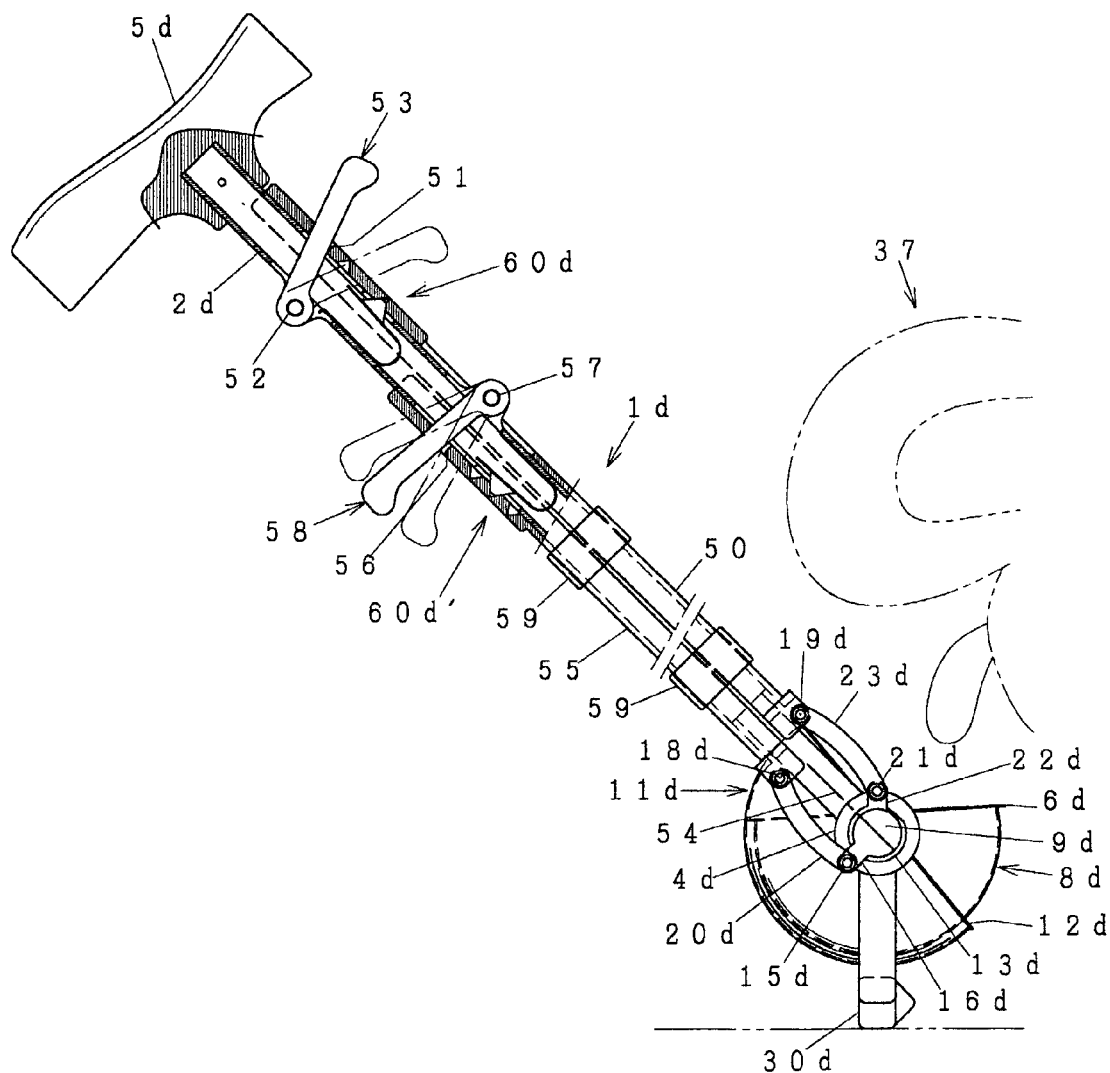
FIG. 8 is a side view of a tool for picking up and carrying dog dung according to another embodiment showing a picking up dung state in that a cover is opened and a shaft part is rearward inclined at 45°.

FIG. 8 shows an embodiment of the present invention in that the container and the cover are independently operated. According to this embodiment, the cover 11d is swung outside the container 8d so as to open/close. The container shaft part 9d is supported by a container shaft hole (not shown) coaxially perforated inside the cover part 10d so as to be supported by the shaft support unit 4d.

A cover operating rod 50 is provided in front of the central line 54 of the shaft part 2d passing through the shaft swing axis slidably up and down. In the operation unit in the upper portion of the cover operating rod 50, a lever hole 51 is formed. To a pin receiving portion in the rear of the shaft part 2d and near at one's finger from the grip part 5d, a lateral support pin 52 is fixed. A cover operation lever 53 supported by the support pin 52 is provided to forward penetrate the shaft part 2d for extending forward.

At an end of the cover shaft part, the cover lever 22d having the link pin 21d is provided to radially extend in front of the central line 54 of the shaft. At the lower end of the cover operating rod 50, the link pin 19d is provided, and the link pin 19d and the link pin 21d are connected together via the cover link 23d.

FIG. 8 shows a picking up state of dung in that the cover operation lever 53 is fully raised and the cover shaft part is rotated via the cover link 23d so as to fully open the cover 11d.

On the other hand, a container operation rod 55 is provided in the rear of the central line 54 of the shaft part 2d slidably up and down. In the upper portion of the container operation rod 55, a lever hole 56 is formed. To a pin receiving portion in front of the shaft part 2d at a position downward separated from the cover operation lever 53, a lateral support pin 57 is fixed. A container operation lever 58 is provided that penetrates the shaft part 2d and extends in the rear direction by being supported by the support pin 57.

At one end of the container shaft part 9d, the container lever 16d is provided that radially extends in the rear of the central line 54 of the shaft, the container lever 16d having the link pin 15d at its end. At the lower end of the container operation rod 55, the link pin 18d is provided, and the link pin 18d and the link pin 15d are connected together via the container link 20d.

The container operation lever 58 is herein raised halfway and the container shaft part 9d is rotated via the container link 20d, so that the container 8d is opened in an inclined position suitable for picking up the dung.

A guide ring 59 is for guiding the cover operating rod 50 and the container operation rod 55 by holding them on the shaft part 2d, and the guide ring 59 is fixed on the side wall of the shaft part 2d.

Cover movement resisting device 60d functions taking two steps of the closing position and the open position while container movement resisting device 60d' functions taking three steps of the closing position, the picking up position, and the open position.

Connecting means for connecting between each operation rod and part of each shaft part may adopt other means, such as a rack and a gear described in the above embodiment. The tool may also be operated with an operation member that directly connects between part of the operation lever means and part of the shaft part without using the operation rod sliding on the shaft part. Furthermore, the tool may also be operated by directly connecting operation members, such as handles, to the container lever 16d and the cover lever 22d, respectively.

FIGS. 9 to 11 show an embodiment in that the container swing axis is located at a position in the rear of the container outer wall separated from the cover swing axis. The shaft support unit 4e provided at an end of the shaft part 2e includes one pin having the shaft swing axis 3e laterally intersecting with the shaft part 2e.

There are provided the flat and circular opening part 6e opening roughly in parallel with the shaft swing axis 3e and the cup-shaped container 8e having the inner wall part 7e deeply fallen in a hemispherical shape, which are arranged in front of the shaft support unit 4e. In the vicinity of the opening part 6e in the rear of the container 8e, the lever part 22e is provided to extend backward. On the base of the lever part 22e, a pin hole is formed that is to be a container supported part. The pin hole is supported by fitting the shaft support unit 4e into the pin hole. Thus, the container 8e is swingable about the shaft swing axis 3'. On the lateral wall in the vicinity of the opening part 6e of the container, the shaft support unit 4' of the cover composed of a pin is provided on the shaft swing axis 3' of the cover.

Above the container 8e, the cover 11e is supported by fitting the lateral wall in the vicinity of its fringe into the swing support unit 4' swingably about the cover swing axis 3'. To the end of the lever part 22e, the lower end of the rear link 23e is connected via the pin 21e rotatably in a longitudinal direction. On the other hand, the boss 16e fallen inside is provided at the front end of the cover 11e, and to the boss 16e, the lower end of the front link 20e is connected via the pin 15e rotatably in a longitudinal direction. The upper ends of the rear link 23e and the front link 20e are connected to the lower ends of the operating rod 17e via the pins 19e and 18e, respectively, rotatably in a longitudinal direction.

At the upper end of the operating rod 17e, the rectangular disk-shaped or circular disk-shaped operation lever 26e is formed. Thus, by operating the operation lever 26e, the operating rod 17e can be moved up and down on the shaft part 2e from code Le to code Te.

When the operation lever 26e is held at the position of FIG. 9, the container 8e is upward directed roughly perpendicularly to the shaft part 2e so that the opening part 6e becomes substantially horizontal. At this time, the cover 11e is placed with the bottom down on the container 8e so that the fringing means 12e blocks off the opening part 6e. When the operation lever 26e is held at the position of code Te, as shown in FIG. 11, the opening part 6e of the container is directed roughly in parallel with the shaft part 2e so as to open in the front by overlapping with the cover 11e. Then, the container is opened in a direction suitable for picking up the dung at a position therebetween.

FIG. 12 shows still another embodiment of the present invention in that the operation rod slidable on the shaft part 2f up and down is divided into container operation rod 17f and cover operation rod 17f', so that the container 8f and the cover 11f are separately operated by the respective operation rod. The container operation rod 17f is positioned in the rear of the shaft part 2f and connected to the rear link 23f. The cover operation rod 17f' is positioned in front of the shaft part 2f symmetrically with the container operation rod 17f about the center line of the shaft part 2f and connected to the front link 20f. Here the portions of the operation member of the cover side common with the container side are designated by like characters having the symbol ' added thereto.

FIG. 12 shows one feature of this embodiment. In the drawing, the container operation lever 26f is located at the position Tf where the lever is fully raised, so that the container 8f is largely inclined in the rear so as to vertically open the opening part 6f in the front. At this time, the cover operation lever 26f' is stopped at the position Lf'; and the cover 11f is rearward rotated to enter the container more than by half so as to discharge almost all the dung in the container by obliquely pushing it in the front.

That is, only by up-and-down operation of the container operation lever 26f, closing the cover and discharging the dung can be executed. Obviously, by the simultaneous operation of the container operation lever 26f and the cover operation lever 26f', the operation shown in FIG. 9 can also be performed.

FIGS. 13 to 15 show further another embodiment of the present invention in that the position of the pin supporting the upper end of the front link 20g is different. The upper end of the front link 20g is connected to the link pin 19g supporting the upper end of the rear link 23g, and on one pin of the operation rod 17g, the upper ends of the rear link and the front link are supported.

According to this embodiment, at part of the link pin 19g below the operation rod 17g, a torsion spring 63 of front link pressure means is mounted. One arm 64 of the torsion spring 63 is hooked to the operation rod 17g while the other arm 65 is hooked to the front link 20g. When the tool is operated to close the container with the cover, the torsion spring 63 is twisted by the front link 20g with the raised tip end so as to slightly push the front link 20g downward as shown in arrow 66 by its repulsive force. Then, by overcoming the resistance due to the friction of a slit ring, the cover 11g is facilitated to rotate in the direction of arrow 67 so as to close the cover more tightly. The torsion spring 63 also serves as smoothing the movement in the termination stage of the closing operation.

The front link pressure means may also employ various elastic bodies, such as a coil spring and a leaf spring, in addition to the torsion spring so as to put them in operation by providing them in the operating rod 17g or part of the shaft part 2g.

According to this embodiment, at the front of the shaft part 2g exposed to the lower portion of the operating rod 17g, a leaf spring 69 of the front link pressure means bulging toward the rear wall 68 of the front link 20g is further mounted. The leaf spring 69, having a predetermined elastic force, is pushed down by abutting the rear wall 68 of the front link descending when the container is fully opened for discharging the dung. Thus, when the container is fully opened, as shown by arrow 70, the front link 20g is slightly pushed forward due to a repulsive force of the leaf spring 69. At this time, the torsion of the torsion spring 63 is loosened so that the force rotating the front link 20g in the rear becomes very weak. Thus, when the tool is operated in the direction closing the container from this position, the front link 20g can be smoothly moved forward together with the cover 11g by the help of the pushing force of the leaf spring 69. Such a leaf spring 69 gives the force pushing forward to the front link 20g stretched out close to the recurvature point (in excess of this point, the front link 20g has no return to the front direction but turns over to the rear of the shaft part 2g) so as to smooth the start of closing operation by the operation unit. The front link pressure means may also employ various elastic bodies, such as a coil spring and a repulsive force of a magnet, in addition to the leaf spring 69, so as to put them in operation by providing them in the operating rod 17g or part of the shaft part 2g.

As shown in FIG. 15, the fringing means 12g is a plastic split ring 72 to be fitted into a ring groove 71 formed on the fringe of the cover. A front spreader spring 74 and a rear spreader spring 75, which are made of an elastic spreader member, are mounted between groove bottoms 73 on front and rear of the ring groove 71 and the inner wall of the split ring 72, respectively. The front spreader spring 74 and the rear spreader spring 75 are made of a slender wire spring or a slender leaf spring having an extended length corresponding to an angle at circumference of about 90° of the ring ranging from the front side to the rear side. At both ends of the spreader spring, hooks 76, which are bent out toward the split ring 72 or the groove bottom of the ring groove, are provided. The hook 76 is fitted and retained into a hole 77 formed at the corresponding position of the inner wall of the split ring 72 or the groove bottom of the ring groove. Then, the spreader springs 74 and 75 push the split ring 72 onto the inner wall of the container by the repulsive force produced by bending the spring along the groove bottom 73 of the ring groove 71 so that the force is distributed mainly on the front and rear sides. The diameter and the length of wire may be herein adjusted so that the rear spreader spring 75 increases its strength and the front spreader spring 74 reduces its strength. When the cover is transferred from the closed position to the opened position for discharging the dung, the cover moves with the rear side of the split ring 72 strongly pushing the inner wall of the container so as to effectively scrape out the dung in the container as well as substances stuck to the wall. By desirably controlling the distribution of the pushing force due to the ring, the frictional force of the cover and the air tightness can be optimized.

Different from spreader springs of the piston for pneumatic machines or internal combustion engines, the used split ring 72 has vertically sectoral swinging movement about the swing axis and along the inner wall of the container. The split ring 72 serves as scraping out the dung stuck to the inner wall of the container. The arrangement of the elastic spreader member according to the embodiment provides the pressure distribution suitable for scraping the dung.

According to the present invention, the container and the cover swinging about one axis in directions opposing each other so as to be opened and closed are supported to one side of the shaft in a protruded state, and the operating member is located adjacent to the shaft and separated from the peripheries of the container and the cover; the operating means is connected to the container and the cover at a position adjacent to the shaft.

INDUSTRIAL APPLICABILITY

According to the present invention, the tool for picking up and carrying dog dung is excellent in picking up, housing, and discharging the dog dung as well as having good appearance and not giving repulsed feeling when carrying it for dog walk, so that this is applicable to people liking pets and people suffering from dung harm.

The invention claimed is:

1. A tool for picking up and carrying dog dung, comprising:
   a shaft comprising a shaft part and a shaft support unit at one end of the shaft part;
   a container swingably supported with respect to a container swing axis perpendicular to the shaft part at the tip of the shaft part, the container having a concave inner wall part and a flat opening part;
   a cover supported on the container swingably with respect to a cover swing axis on either inner side or outer side of the container near a peripheral portion of the container in a direction opposing the container, the cover swing axis laterally passing through a center near the opening part of the container, the cover having fringing means for approaching and covering the opening part of the container and a cover part arranged inside the fringing means; and
   an operating means including an operation unit retained on the shaft part slidably along the axial direction and an operation member including container connecting means rotatably connected at a lower portion to a part of the container and cover connecting means rotatably connected to a part of the cover,
   wherein when the opening part of the container is covered with the cover by operating the operating means, the container is upward positioned perpendicularly to the shaft part; during discharging dung, the container and the cover are inclined to one side of the shaft part so as to open; and at an intermediate position of opening/closing, the container is opened in a direction for picking up the dung, and
   wherein the shaft support unit having a swing axis parallel to the cover swing axis; the container is supported so that a container supported part formed on one side of a rear outer wall near the opening part and having the same axis as the cover swing axis, the container supported part supported on the shaft support unit; and the container swings about the container swing axis of the shaft support unit while the cover swings about the cover swing axis in a direction opposing the container.

2. The tool according to claim 1, wherein the container supported part includes a container shaft part arranged on one side of the container on the cover swing axis near the opening part of the container to extend outside in parallel with the opening part; the cover includes a cover shaft part arranged on the same side as the container shaft part on the cover swing axis in parallel with the fringing means; the cover is supported at the shaft support unit so that the cover shaft part is together supported on one of outer and inner sides of the container coaxially with the container shaft part and swingably about the cover swing axis; the operation member of the operating means includes container connecting means rotatably connected to a part of the container shaft part on the side of the shaft part and cover connecting means rotatably connected to a part of the cover shaft part; and the container and the cover are swung about the cover swing axis in directions opposing each other.

3. The tool according to claim 2, wherein connecting means of the operation member includes:
   the container connecting means including a container link with one end connected to one part of the operation member on one side of the front and rear of the swing axis and the other end connected to a container lever formed in the container shaft part; and
   the cover connecting means including a cover link with one end connected to the other part of the operation member on the other side of the swing axis and the other end connected to a cover lever formed in the cover shaft part.

4. The tool according to claim 2, wherein connecting means of the operation member includes:
   the container connecting means including a container rack formed in one part of the operation member on one side of the front and rear of the swing axis in parallel with the shaft part and a container gear formed in the container shaft part to mate with the container rack;
   the cover connecting means including a cover rack formed in the other part of the operation member on the other side of the swing axis in parallel with the shaft part and a cover gear formed in the cover shaft part to mate with the cover rack.

5. The tool according to claim 1, wherein the container supports the container supported part arranged on one side part of the rear outer wall in the vicinity of the opening part of the container on the shaft support unit; the operation member of the operating means includes a rear link with the upper end connected to the under part of the operation member and the lower end rotatably connected to part of the rear side of the container and a front link with the upper end connected to the under part of the operation member and the lower end rotatably connected to part of the cover in front of the cover swing axis; and the container swings about the container swing axis of the shaft support unit while the cover swings about the cover swing axis in a direction opposing the container.

6. The tool according to claim 5, wherein the operating means includes front link pressure means provided in part of the operating means including operation rod adjacent to the shaft part for pushing a front link in a direction closing the cover in the vicinity of front of a cover closing position.

7. The tool according to claim 5, wherein the operating means includes front link pressure means provided in part of the operating means including operation rod adjacent to the shaft part for pushing the rear wall of a front link forward with a predetermined elastic force when the container and the cover are fully opened.

8. The tool according to claim 1, wherein the operation member of the operating means includes:
   a container operation member including a container operation unit provided on one side of the shaft part and the container connecting means for connecting the container operation unit to part of the container; and
   a cover operation member including a cover operation unit provided on the other side of the shaft part and the cover connecting means for connecting the cover operation unit to part of the cover,
   wherein the container and the cover are operated independently.

9. The tool according to claim 1, wherein the fringing means of the cover includes:
   a ring groove formed around the periphery of the cover;
   a split ring to be fitted into the ring groove;
   a front elastic spreader member held between the inner wall of the split ring and the bottom of the ring groove on the cover front side; and
   a rear elastic spreader member held between the inner wall of the split ring and the bottom of the ring groove on the cover rear side, and
   wherein both ends of the respective spreader members are retained in holding holes formed on walls of the split ring located on front and rear sides of the cover, respectively.

10. The tool according to claim 9, wherein the spreading force of the rear elastic spreader member is greater than that of the front elastic spreader member.

11. A tool for picking up and carrying dog dung, comprising:
a shaft comprising a shaft part and a shaft support unit at one end of the shaft part, the shaft support unit having a swing axis in a direction crossing the shaft part;
a container having a concave inner wall part and a flat opening part, the container supported swingably with respect to a container swing axis perpendicular to the shaft part at the tip of the shaft part;
a cover disposed on either inner side or outer side of the container, the cover having a peripheral portion and a cover portion inside the peripheral portion, and supported near a peripheral portion swingably with respect to a cover swing axis in a direction opposing the container;
an operation unit retained on the shaft part and slidable along the axial direction;
container connecting means rotatably connecting the container to the operation unit; and
cover connecting means rotatably connecting the cover to the operation unit,
wherein when the opening part of the container is covered with the cover, the container is upward positioned with the flat opening part approximately perpendicular to the shaft part.

12. The tool according to claim 11, wherein the container is supported by the shaft support unit at a side wall portion near the flat opening part of the container, and the container having the container swing axis which is a same axis as the cover swing axis.

13. The tool according to claim 11, further comprising:
a container supported part, extending outward from a side wall of the container in the cover swing axis, the container supported part comprising a container shaft part swingably supported by the shaft support unit at either outer side or inner side of the cover shaft part, and
a cover shaft part, extending outward from a side wall of the cover in the cover swing axis, the cover shaft part being supported coaxially with the container shaft part at either outer side or inner side of the container shaft part,
wherein the container connecting means is rotatably connecting the operation unit and a part of the container shaft part at a side part of the shaft.

14. The tool according to claim 13,
wherein the container connecting means comprises
a container lever formed at a part of the container shaft part, the container lever extending on either front side or rear side of the shaft swing axis, and
a container link rotatably connecting the operation unit to the container lever; and
wherein the cover connecting means comprises
a cover lever formed at a part of the cover shaft part, the cover lever extending on either front side or rear side, opposite to the container lever, of the shaft swing axis, and
a cover link rotatably connecting the operation unit to the cover lever.

15. The tool according to claim 13,
wherein the container connecting means comprises
a container gear formed at a part of the container shaft part, and
a container rack disposed at a lower portion of the operation unit and extending in a longitudinal direction of the shaft and engaging with the container gear on either front side or rear side of the shaft swing axis, and
wherein the cover connecting means comprises
a cover gear formed at a part of the cover shaft part, and
a cover rack disposed at a lower portion of the operation unit and extending in a longitudinal direction of the shaft and engaging with the cover gear on either front side or rear side, opposite to the container rack, of the shaft swing axis.

16. The tool according to claim 11,
wherein the container has a container supported part at a side wall portion near the flat opening part of the container, the container being swingably supported by the shaft support unit,
the container connecting means comprises a rear link rotatably connecting the operation unit to a part of the container shaft part on a rear side of the container supported part, and
the cover connecting means comprises a front link rotatably connecting the operation unit to a part of the cover on a front side of the cover swing axis.

17. The tool according to claim 16, further comprising an elastic body to press the front link when the cover is at a closed position, the elastic body disposed between a lower portion of the operation unit and the front link.

18. The tool according to claim 16, further comprising an elastic body to press the front link when the cover is at a fully open position, the elastic body disposed between a lower portion of the operation unit and the front link.

19. The tool according to claim 11,
wherein the container connecting means connects a container operation unit and a portion of the container, the container operation unit being formed on a side of the periphery of the shaft part and slidable in a longitudinal direction of the shaft part, and
the cover connecting means connects a cover operation unit and a portion of the cover, the cover operation unit being formed on another side of the periphery of the shaft part and slidable in a longitudinal direction of the shaft part.

20. The tool according to claim 11, wherein the cover has a ring groove at a peripheral portion of the cover, and further comprising:
a split ring to be fitted into the ring groove;
a front elastic spreader member held between the inner wall of the split ring and the bottom of the ring groove on the cover front side; and
a rear elastic spreader member held between the inner wall of the split ring and the bottom of the ring groove on the cover rear side.

21. The tool according to claim 20, wherein the spreading force of the rear elastic spreader member is stronger than that of the front elastic spreader member.

* * * * *